United States Patent

Dobler

[11] Patent Number: 5,874,115
[45] Date of Patent: Feb. 23, 1999

[54] INJECTION BLOW MOLDING MACHINE

[75] Inventor: Walter Dobler, Bad Urach-Seeburg, Germany

[73] Assignee: Systec Engineering Knauer GmbH & Co. KG, Bad Urach, Germany

[21] Appl. No.: 894,022
[22] PCT Filed: Jan. 23, 1996
[86] PCT No.: PCT/EP96/00271
§ 371 Date: Nov. 24, 1997
§ 102(e) Date: Nov. 24, 1997
[87] PCT Pub. No.: WO96/26065
PCT Pub. Date: Aug. 29, 1996

[30] Foreign Application Priority Data

Feb. 24, 1995 [DE] Germany .................. 195 06 599.9

[51] Int. Cl.⁶ .................... B29C 49/06; B29C 49/56
[52] U.S. Cl. .................... 425/529; 425/533; 425/534; 425/541
[58] Field of Search .................... 425/529, 533, 425/534, 541

[56] References Cited

U.S. PATENT DOCUMENTS

| | | | |
|---|---|---|---|
| 2,331,687 | 10/1943 | Hobson | 264/536 |
| 2,789,312 | 4/1957 | Borer | 425/533 |
| 3,784,348 | 1/1974 | Aoki | 425/534 |
| 3,807,923 | 4/1974 | Cannon et al. | 425/533 |
| 3,850,562 | 11/1974 | Takeuchi et al. | 425/534 |
| 3,944,643 | 3/1976 | Sato et al. | 264/532 |
| 4,140,468 | 2/1979 | Duga | 425/534 |
| 4,372,910 | 2/1983 | Stroup et al. | 264/532 |
| 4,427,359 | 1/1984 | Fukuoka et al. | 425/529 |
| 4,648,824 | 3/1987 | Aoki | 425/534 |
| 5,256,048 | 10/1993 | Jacobs et al. | 425/572 |

FOREIGN PATENT DOCUMENTS

| | | |
|---|---|---|
| 0 180 524 A2 | 5/1986 | European Pat. Off. . |
| 0 411 592 A2 | 2/1991 | European Pat. Off. . |
| 1394797 | 3/1965 | France . |
| 1 136 095 | 9/1962 | Germany . |
| 1 163 000 | 2/1964 | Germany . |
| 1 209 278 | 1/1966 | Germany . |
| 1 479 003 | 1/1969 | Germany . |
| 38 11 465 C2 | 10/1994 | Germany . |
| 195 06 599 C1 | 3/1996 | Germany . |
| 2 078 601 | 1/1982 | United Kingdom . |

Primary Examiner—Robert Davis
Attorney, Agent, or Firm—Seed and Berry LLP

[57] ABSTRACT

The present invention refers to an injection moulding machine including an injection moulding tool which includes at least one female die and one male die. A blow moulding tool is arranged in closely spaced relationship with the injection moulding tool. A transfer member is arranged between the injection moulding tool and the blow moulding tool, the transfer member being used for transferring a preform from the injection moulding tool to the blow moulding tool. The movement of the transfer member is synchronized with the opening and closing movements of the injection moulding tool and of the blow moulding tool in such a way that said transfer member moves into the tool area of the open injection moulding tool, removes the respective preform from the male die or from the female die, moves out of the tool area and introduces the preform into the blow moulding tool that is open to an adequate extent.

8 Claims, 2 Drawing Sheets 5,874,115

INJECTION BLOW MOLDING MACHINE

TECHNICAL FIELD

The present invention refers to an injection moulding machine including an injection moulding tool which comprises at least one female die and one male die.

BACKGROUND OF THE INVENTION

Such machines are, of course, known in the prior art to a large extent and they are used in great variety of cases. Such injection moulding machines are often also used for producing preforms which are subsequently subjected to a blowing process. In the production of large-volume beverage bottles of plastic material, for example, it is known to produce a preform in an injection moulding machine and to let said preform cool down so that it can then be given its final shape after an appropriate thermal pretreatment directly at the beverage-manufacturing firm. In this connection there are, however, also solutions in the case of which the preform is removed from the injection moulding machine and supplied to a conveyor means passing with said preform a large number of intermediate processing steps, such as e.g. crystallization of the thread area for the screw top. Finally, a heat treatment step is carried out prior to the actual blowing process. These processes known in the prior art have the great disadvantage that they are specially adapted to the production of beverage bottles and that this type of device has not gained general acceptance for producing other injection-moulded/blow-moulded parts.

SUMMARY OF THE INVENTION

It is therefore the object of the present invention to provide an injection moulding machine that can be used in a greater variety of cases.

According to the present invention, this object is achieved by the features that a blow moulding tool is arranged in closely spaced relationship with said injection moulding tool, and that a transfer member is arranged between said injection moulding tool and said blow moulding tool, said transfer member being used for transferring a preform from said injection moulding tool to said blow moulding tool and the movement of said transfer member being synchronized with the opening and closing movements of said injection moulding tool and of said blow moulding tool in such a way that said transfer member moves into the tool area of the open injection moulding tool, removes the respective preform from the male die or from the female die, moves out of said tool area and introduces the preform into the blow moulding tool that is open to an adequate extent.

It is true that the topic of integrating a blow moulding tool in an injection moulding machine has already been dealt with in DE-pat. 3 811 465, but in the case of this known device the injection moulding tool and the blow moulding tool are arragned one after the other in an in-line arrangement and they have a common, rotatable male die, the preforms produced in the injection moulding tool remaining on the mould cores of the male die and being transferred to the blow moulding station by rotating the whole male die. The device has the adavantage that, due to the short distances provided, cooling down of the preform is prevented to a very large extent. In comparison with the present invention, said device is, however, disadvantageous insofar as twice the number of cores is required on a male die having a complicated structural design. A further advantage of the present invention is to be seen in the circumstance that, on the basis of the transfer member provided in the case of the present invention, the masses which have to be moved are only small in comparison with a rotatable male die, whereby higher operating speeds are possible and energy can be saved. In addition, the device according to the present invention permits a comparatively uncomplicated tool change. Due to the fact that the structural designs of the injection moulding tool and of the blow moulding tool are kept simple, small overall heights of the tools are achieved, a stacked mode of arrangement being also imaginable in this connection. In the case of the present invention it is, in this respect, of essential importance that the injection moulding tool and the blow moulding tool are arranged essentially directly side by side so that the paths along which the preform has to be moved by the transfer member are very short and so that the residual heat resulting from the injection moulding process can be utilized for the blow moulding process.

In order to permit processing of plastic materials which are extremely difficult to process, such as PET, the blow moulding tool can have associated therewith at least one stretching rod. The stretching rods can then be moved into the associated blowing moulds in accordance with a prestretching program. The prior art described hereinbefore was disadvantageous insofar as such stretching rods had to be integrated in the mould core and that, consequently, only a limited amount of space was available for said stretching rod. The stretching rod according to the present invention can have any size that is necessary and it can be optimized accordingly. In addition, due to the separate arrangement of stretching rods and mould cores, a plurality of cooling or heating circuits can easily be arranged in the male die, also in the mould cores, since space for a prestretching rod is no longer required at this point.

The movement of the transfer member can be positively coupled to the opening and closing movements of the injection moulding tool and/or of the blow moulding tool in an advantageous manner. This positive coupling has the effect that it is not necessary to provide a separate drive for the movement of the transfer member, which separate drive would then have to be synchronized with the opening and closing movements of the tools.

In accordance with a preferred embodiment, the transfer member is provided with a pivot arm which is adapted to be pivoted about a pivot axis that is arranged in a stationary manner with regard to one tool half of the injection moulding tool and/or blow moulding tool. The term tool half is to be interpreted such that it stands for one main area of the respective tool. The stationary arrangement of the transfer member with regard to such a tool half guarantees that the transfer member is always arranged at precisely the correct position; this mode of arrangement permits the pivot axis to be arranged in the best possible manner in such a way that the pivot arm provided for operating the injection moulding tool and the blow moulding tool can be as short as possible.

In accordance with a special embodiment of the present invention, the opening directions of the injection moulding tool and of the blow moulding tool are oriented transversely to one another, preferably at an angle of approx. 90°. In this embodiment, the transfer member has to cover a pivoting range of up to 180°. This arrangement is particularly suitable for vertical injection moulding machines, since the finished workpiece to be removed from the blowing mould will already be positioned correctly in this case and can e.g. drop automatically onto a conveyor belt. A further handling step for turning the workpiece over is not necessary.

A further preferred embodiment provides the feature that the opening directions of the injection moulding tool and of the blow moulding tool are oriented parallel to one another. Such an arrrangement offers itself for cases of use in which the workpiece is removed downwards, since the workpieces which are finished at the end of the blow moulding process are then again located at a particularly advantageous position for removal. This type of embodiment can, of course, also be used in cases where the blow moulding tool is arranged on the side or at the top. This embodiment can be further developed in an advantageous manner in such a way that at least the moving parts (e.g. female die and male die, respectively, or left and right mould halves, respectively) of the injection moulding tool and of the blow moulding tool are fixedly interconnected for carrying out a common closing and opening movement. This structural design offers the enormous advantage that only a single drive is required for the closing and opening movements of both tools and that, consequently, no special positive coupling between the parts of the mould has to be realized. The tools simply open and close parallel to one another.

In order to save additional space, the stretching rod can be integrated in the injection moulding tool tranversely to the opening direction of said tool. The blow moulding tool can thus be arranged particularly closely to the injection moulding tool, since the stretching rods are arranged e.g. in pockets in the injection moulding tool.

In order to avoid the necessity of moving the transfer member to a non-operative position between the injection moulding tool and the blow moulding tool during the processing steps, said transfer member can be implemented as a constituent part of the female die or of the male die and, during the injection process, it can dwell in the injection moulding tool and form part of the mould. It is, however, also possible to implement the transfer member as a constituent part of the blowing mould so that, during the blowing process, it dwells in the blow moulding tool and forms part of said blowing mould. It follows that the transfer member can be adapted to the respective requirements to be fulfilled, and this is very important e.g. when products having a thread at the top end are manufactured. The integration of the transfer member in the injection moulding tool also avoids the problem of incorrectly executed transfer functions, since the plastic material is applied to certain areas of the transfer member by injection moulding and abuts therefore precisely to the contours of said transfer member.

For reliably removing especially longer preforms from the injection moulding tool without damaging them, the transfer member can be controlled in such a way that it carries out a lift-off movement for removing the preform from the male die or from the female die. Especially in combination with a transfer member provided with a pivot arm, this guarantees that any contact between the preform and the male die or the female die is avoided during the removal operation.

At this point it should be mentioned that the present invention can be realized independently of the number of die cavities in the injection moulding tool and in the blow moulding tool as long as it is guaranteed that the preform can be transferred to the blow moulding tool within the shortest possible time. A great variety of different transfer members, e.g. also suction members, can be used as a transfer member.

In the following, embodiments of the present invention are explained in detail on the basis of a drawing, in which

DETAILED DESCRIPTION OF THE INVENTION

Making reference to FIGS. 1 and 2, a first embodiment of the present invention will be explained hereinbelow. At this point, it should be pointed out that, although the injection moulding machine shown schematically in the figures is preferably seen in a top view, additional advantages may perhaps be obtained by any logical arrangements resulting from a rotational displacement of this arrangement.

Figure 1:
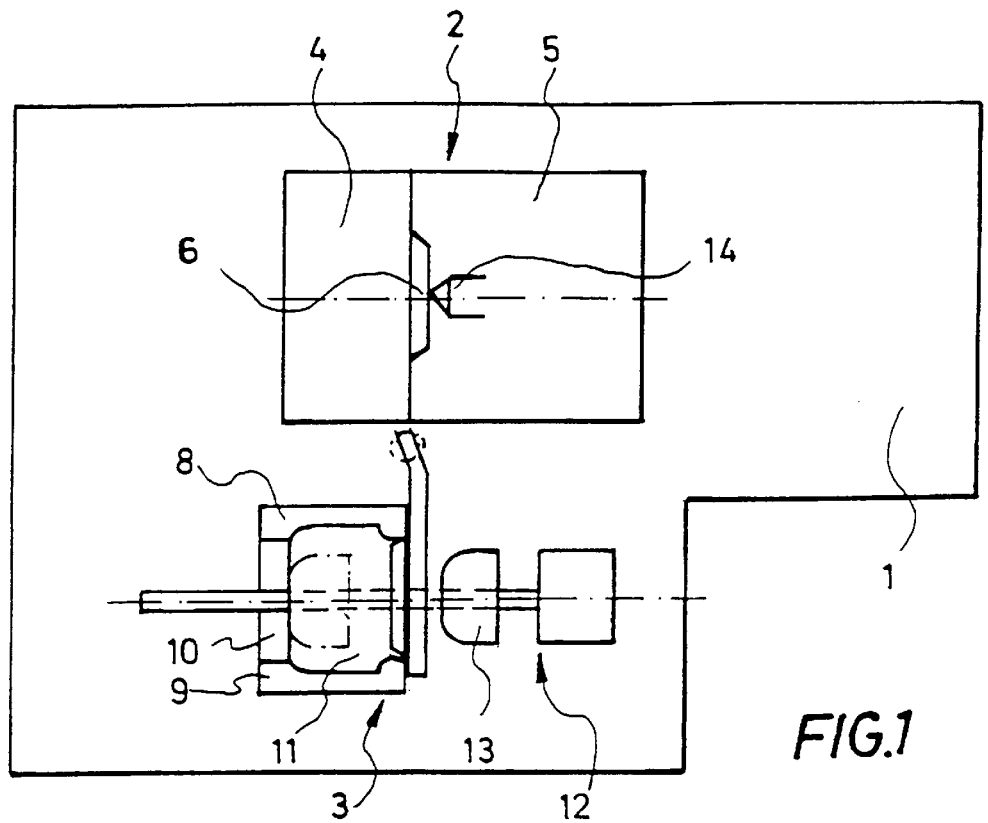
FIG. 1 shows a schematic representation of a first embodiment of an injection moulding machine according to the present invention in a condition in which the tools are closed.
Figure 2:
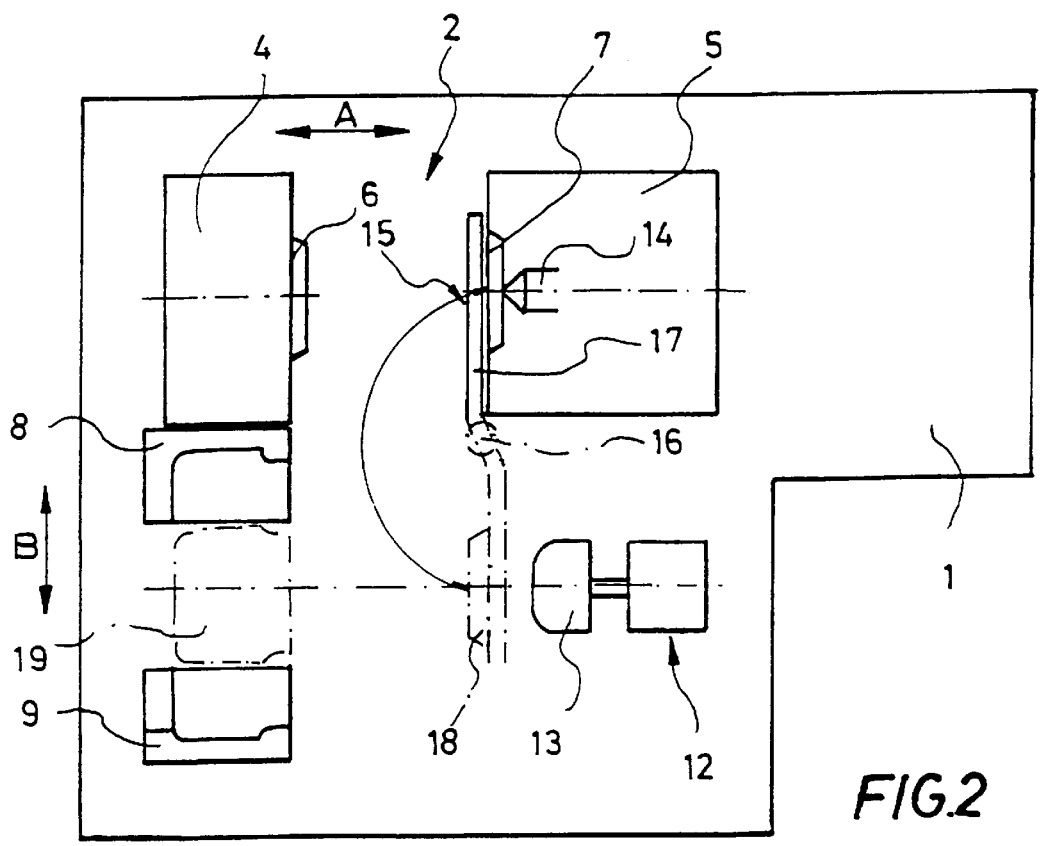
FIG. 2 shows the embodiment of FIG. 1 in a condition in which the tools are open.

The injection moulding machine shown in FIGS. 1 and 2 comprises a machine bed 1 having arranged thereon an injection moulding tool 2 and a blow moulding tool 3. The injection moulding tool 2 is composed of a male die 4 and a female die 5. The male die 4 is provided with at least one mould core 6 engaging the die cavity 7 of the female die 5 in spaced relationship therewith so as to form a mould hollow.

The blow moulding tool 3 shown in this embodiment comprises left and right mould halves 8, 9 and a bottom closure member 10. Each blowing mould 11, which is defined by said two mould halves 8, 9 and said bottom closure member 10, has associated therewith a prestretching means 12 with an extensible and retractable stretching rod 13.

The injection moulding machine additionally comprises an injection moulding unit, not shown, which is only schematically outlined in the form of its injection nozzle 14 and which is capable of injecting plastic material into said mould hollow.

A transfer member 15 is provided between said injection moulding tool 2 and said blow moulding tool 3, said transfer member 15 having a pivot axis 16 that is arranged in a stationary manner on the female die 5 and a pivot arm 17 which is adapted to be pivoted about said pivot axis 16. The movements of the transfer member 15 are positively coupled to the closing and opening movements of the injection moulding tool 2 or, alternatively, to the closing and opening movements of the blow moulding tool 3. The opening direction A of the injection moulding tool 2 and the opening direction B of the blow moulding tool 3 extend at right angles to one another in the present embodiment. The closing and opening movements of the injection moulding tool 2 and of the blow moulding tool 3 can take place separately or such that they are positively coupled to one another. This also applies to the movement and to the control of the prestretching means 12.

In the following, the mode of operation and the function of the above-described embodiment will be explained in detail.

When the injection moulding machine is in the condition shown in FIG. 1, plastic material is injected into the hollow of the injection moulding tool 2. It goes without saying that, although only one die cavity 7 and one mould core 6 are shown in the present embodiment, a plurality of mould hollows can be provided. At the same time, the preform 18, which has previously been removed from the injection moulding tool 2, is blow moulded in the blow moulding tool 3. This is done by closing the blow moulding tool 3, blowing in pressurized air and by simultaneously prestretching by means of the stretching rod 13 which is moved into the workpiece during this working step. The transfer member 15 of this embodiment has a structural design of such a nature that it remains in the front area of the blowing mould 11 during the blowing process and forms an area of said blowing mould.

When the injection moulding process has been finished on the one side and when the blow moulding process has been finished on the other side, both tools 2, 3 will open. The finished workpiece 19 is removed from the blowing mould 11 and, simultaneously, the transfer member 15 pivots into the tool area of the injection moulding tool 2, which is just about to open, removes the preform 18 and pivots out of the tool area at the beginning of the closing movement at the latest, whereupon it transfers the preform 18 to the re-closing blowing mould 11.

It is evident that, due to the comparatively filigreed structural design of the transfer member 15 in comparison with the tools 2, 3, a transfer element having a very light weight is provided, said transfer element being, in addition, adapted to be moved in and out of the respective tool areas at very high speeds because the masses which have to be displaced are only small. This permits the preform 18 to be transferred to the blow moulding tool 3 within the shortest possible period of time, whereby the the residual heat resulting from the injection moulding process and existing in the preform 18 can be utilized for the blowing process without any necessity of providing additional heating elements; however, such heating elements can, of course, be integrated in the transfer member 15, if desired.

In addition, the positive control of the movement of the transfer member 15 can be effected such that, when the preform 18 is being removed from the injection moulding tool 2, said transfer member 15 will first carry out a linear lift-off movement, which takes place essentially in the opening direction A, prior to carrying out the actual pivotal movement.

In the following, a second embodiment of the present invention will be explained in detail on the basis of FIGS. 3 and 4. In order to avoid repetitions, the essential points discussed are only the important differences. Identical reference numerals are here used for similar and identical components.

The essential difference between this embodiment and the first embodiment is that the opening direction A of the injection moulding tool 2 and the opening direction B of the blow moulding tool 3 are parallel to one another. Hence, the transfer member 15 only has to carry out a 90° pivotal movement for removing the preform 18 from the injection moulding tool 2 and for transferring it to the blow moulding tool 3. The prestretching means 12 can in this case be integrated in the rear portion of the female die 5 so that, in the retracted condition, it will essentially not project beyond the lateral surface of the injection moulding tool 2. It is therefore possible to arrange the blow moulding tool 3 as closely as possible to the injection moulding tool 2. The great advantage of this embodiment is to be seen in the fact that, when it is, for example, assumed that the male die 4 and the left mould half 8 are arranged in a stationary manner and that the female die 5 and the right mould half 9 move relative to said first-mentioned components, the right mould half 9 and the female die 5 are fixely interconnected such that they can be displaced together. Hence, only a single drive is required, either for the female die 5 or for the right mould half 9, for realizing the closing and opening movements for both tools 2, 3.

Figure 3:
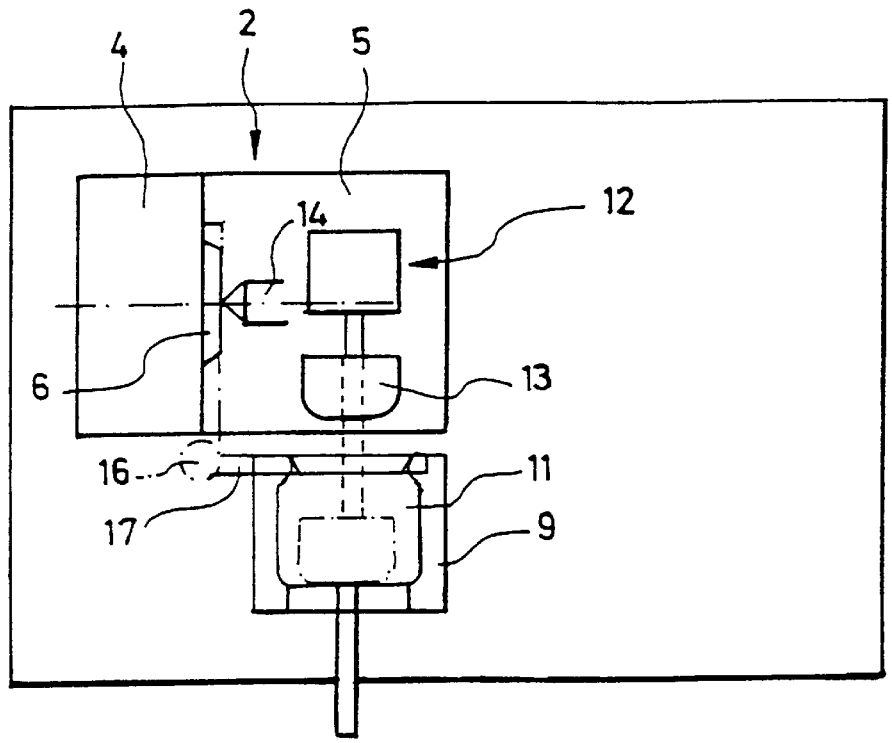
FIG. 3 shows a schematic representation of a second embodiment of an injection moulding machine according to the present invention in a condition in which the tools are closed.
Figure 4:
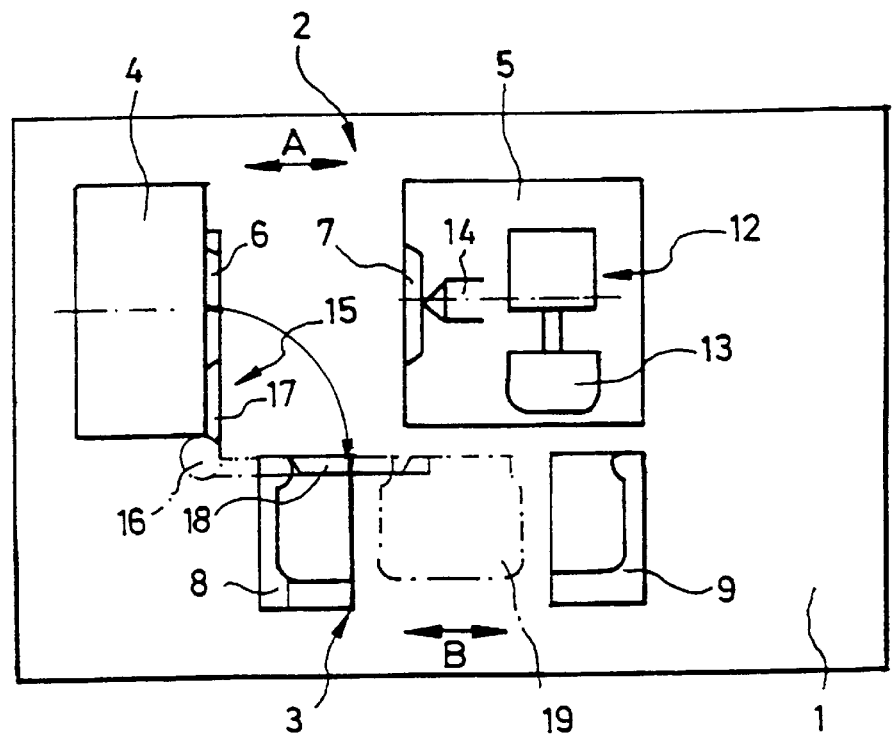
FIG. 4 shows the embodiment of FIG. 3 in a condition in which the tools are open.

The embodiment shown in FIGS. 3 and 4 is also particularly suitable for removing the workpieces 19 from below, i.e. FIGS. 3 and 4 are to be regarded as side views. On the basis of this mode of arrangement, the workpiece 19 again has a suitable position which is advantageous for further transport of said workpiece and which permits of the number of handling steps to be reduced.

The mode of operation and the function of the second embodiment are similar to that of the first embodiment exept for the fact that the pivoting path of the transfer member 15 is shorter.

In order to supplement the above, it should be mentioned that the embodiments described hereinbefore can also be used in a very advantageous manner for producing cups with a hollow bottom, chalice-like cups and rectangular cups as well as for processing a great variety of materials.

I claim:

1. An injection moulding machine including an injection moulding tool which comprises at least one female die and one male die, a blow moulding tool arranged in closely spaced relationship with said injection moulding tool, and a transfer member arranged between said injection moulding tool and said blow moulding tool, said transfer member being used for transferring a preform from said injection moulding tool to said blow moulding tool and the movement of said transfer member being synchronized with opening and closing movements of said injection moulding tool and of said blow moulding tool, the opening directions of the injection moulding tool and of the blow moulding tool being oriented parallel to one another, wherein at least selected moving parts of the injection moulding tool and of the blow moulding tool are fixedly interconnected for carrying out a common closing and opening movement, said transfer member being configured to move into a tool area of the open injection moulding tool, remove the respective preform from the male die or from the female die, move out of said tool area and introduce the preform into the blow moulding tool that is open to an adequate extent, and wherein the transfer member is provided with a pivot arm pivotable about a pivot axis arranged in a stationary manner relative to one tool half of at least one of the injection moulding tool and blow moulding tool.

2. An injection moulding machine according to claim 1, wherein the blow moulding tool has associated therewith at least one stretching rod.

3. An injection moulding machine according to claim 1, wherein the movement of the transfer member is positively coupled to the opening and closing movements of at least one of the injection moulding tool and the blow moulding tool.

4. An injection moulding machine including an injection moulding tool which comprises at least one female die and one male die, a blow moulding tool arranged in closely spaced relationship with said injection moulding tool, and a transfer member arranged between said injection moulding tool and said blow moulding tool, said transfer member being used for transferring a preform from said injection moulding tool to said blow moulding tool and the movement of said transfer member being synchronized with opening and closing movements of said injection moulding tool and of said blow moulding tool, the opening directions of the injection moulding tool and of the blow moulding tool being oriented parallel to one another, wherein at least selected moving parts of the injection moulding tool and the blow moulding tool are fixedly interconnected for carrying out a common closing and opening movement, said transfer member configured to move into a tool area of the open injection moulding tool, remove the respective preform from the male die or from the female die, move out of said tool area and introduce the preform into the blow moulding tool that is open to an adequate extent, and wherein the transfer member is a constituent part of one of the female die and the male die and, during an injection process, said transfer member dwells in the injection moulding tool and forms part of the mould.

5. An injection moulding machine including an injection moulding tool which comprises at least one female die and one male die, a blow moulding tool arranged in closely spaced relationship with said injection moulding tool, and a transfer being arranged between said injection moulding tool and said blow moulding tool, said transfer member being used for transferring a preform from said injection moulding tool to said blow moulding tool and the movement of said transfer member being synchronized with opening and closing movements of said injection moulding tool and of said blow moulding tool, opening directions of the injection moulding tool and the blow moulding tool being oriented parallel to one another, wherein at least selected moving parts of the injection moulding tool and of the blow moulding tool are fixedly interconnected for carrying out a common closing and opening movement, said transfer member configured to move into a tool area of the open injection moulding tool, remove the respective preform from the male die or the female die, move out of said tool area and introduce the preform into the blow moulding tool that is open to an adequate extent, and wherein the transfer member is a constituent part of the blowing mould and, during the blowing process, said transfer member dwells in the blow moulding tool and forms part of said blowing mould.

6. An injection moulding machine according to one of claims 4 or 5 wherein the transfer member is provided with a pivot arm pivotable about a pivot axis arranged in a stationary manner with regard to one tool half of at least one of the injection moulding tool and blow moulding tool.

7. An injection moulding machine according to one of claims 1 wherein the transfer member is a constituent part of the blowing mould and that, during the blowing process, said transfer member dwells in the blow moulding tool and forms part of said blowing mould.

8. An injection moulding machine according to one of the claims 1, 2, 3, 4, or 5 wherein the transfer member is controlled in such a way that it carries out a lift-off movement for removing the preform from the male die or the female die.

* * * * *